Patented July 7, 1936

2,046,793

UNITED STATES PATENT OFFICE 2,046,793

AUTOMOBILE TOP DRESSING

Emil B. Schroeder, Lubbock, Tex.

No Drawing. Application August 17, 1933,
Serial No. 685,648

1 Claim. (Cl. 134—17)

The object of my invention is to provide a top dressing for automobiles which will possess one or all of the properties of giving an acceptable surface appearance thereto, render it waterproof, act as a preservative against deterioration and make it soft and pliable.

My invention consists in whatever is described by or included in the appended claim.

A satisfactory formula which achieves splendidly the purpose of my invention is as follows:

| | |
|---|---|
| Exterior or outside varnish of high gloss | 1¼ gals. |
| Tung oil | 1 gal. |
| Japan dryer | ½ gal. |
| Creosote | 1 pint |
| Raw rubber | 2½ gals. |
| Raw linseed oil | 6 gals. |
| Pure spirits turpentine | 1 quart |
| White lead | 12½ pounds |
| Grinder's black, or lamp black | 1½ pounds |

The foregoing ingredients are well ground and mixed or compounded. Applied to an automobile top, it makes it waterproof, and leaves it soft and pliable, and acts as a preserver.

The varnish gives a gloss finish and toughens and prevents cracking of the fabric; the creosote by penetrating the fabric acts as a preservative, and loosens the fibers; the rubber toughens and waterproofs and renders it soft and pliable; and the tung oil thins and hardens the composition.

The dryer is used to hasten setting; the linseed oil gives body, the turpentine is used for thinning and to make a binder, white lead is used as a pigment and the black or lamp black is used as a blacking and to give body to the compound.

An inside varnish or shellac may be used in place of the outside varnish, a high grade roof or bridge paint may be substituted for the tung oil, the creosote, white lead, and black or lamp black, with satisfactory results; for the raw rubber a vulcanizing cement may be used, and instead of raw linseed oil, boiled linseed oil, or any other suitable oil serving the same purpose, may be used.

Where a colorless top dressing is desired, as for khaki tops, a composition of the following may be used

| | |
|---|---|
| Raw rubber | ½ gal. |
| Raw linseed, or boiled oil | ½ gal. |
| Pure spirits turpentine | 1 quart |
| Exterior or interior varnish | 1 gal. |

Of course I do not limit myself to the dressing or treatment of automobile tops, as a dressing or coating embodying my invention may be advantageously used for fabrics or materials other than automobile tops which present similar requirements.

The rubber used in the composition is a solution. It is dissolved in a high grade gasoline, or naphtha or benzine, for example. The proportions in making the solution are approximately 50 per cent raw rubber and 50 per cent solution. In the mixing or compounding process the solvent disappears by evaporation.

What I claim is:

A dressing or coating composition for the purpose described that includes varnish in the proportion of substantially one and a quarter gallons, tung oil in the proportion of substantially one gallon, raw linseed oil in the proportion of substantially six gallons, creosote in the proportion of substantially one pint, a drier in the proportion of substantially a half a gallon, raw rubber, turpentine in the proportion of substantially a quart, white lead in the proportion of substantially twelve and a half pounds and a substance that imparts a black appearance to the surface dressed in the proportion of substantially one and a half pounds.

EMIL B. SCHROEDER.